United States Patent [19]
Niikura

[11] Patent Number: 5,303,797
[45] Date of Patent: Apr. 19, 1994

[54] TORQUE DISTRIBUTION CONTROL DEVICE FOR FOUR-WHEEL DRIVE VEHICLE

[75] Inventor: Yasuhiro Niikura, Kanagawa, Japan

[73] Assignee: Nissan Motor Co., Ltd., Yokohama, Japan

[21] Appl. No.: 785,789

[22] Filed: Oct. 31, 1991

[30] Foreign Application Priority Data

Nov. 13, 1990 [JP] Japan ................. 2-307512

[51] Int. Cl.⁵ ......................................... B60K 17/348
[52] U.S. Cl. .................................... 180/248; 180/233; 192/60
[58] Field of Search ............... 180/248, 249, 233, 297, 180/197, 247; 192/60

[56] References Cited

U.S. PATENT DOCUMENTS

| | | | |
|---|---|---|---|
| 4,754,834 | 7/1988 | Ozaki | 180/247 |
| 4,921,085 | 5/1990 | Takemura et al. | 192/60 |
| 4,957,473 | 9/1990 | Takemura et al. | 475/231 |
| 4,958,711 | 9/1990 | Okubo et al. | 192/60 |
| 5,024,309 | 6/1991 | Takemura et al. | 192/60 |
| 5,083,635 | 1/1992 | Tashiro | 180/248 |
| 5,119,298 | 6/1992 | Naito | 180/197 |
| 5,152,362 | 10/1992 | Naito | 180/233 |

FOREIGN PATENT DOCUMENTS

| | | |
|---|---|---|
| 61-169326 | 7/1986 | Japan . |
| 62-50231 | 3/1987 | Japan . |
| 0213434 | 9/1991 | Japan ................. 180/248 |

Primary Examiner—Margaret A. Focarino
Assistant Examiner—Anne Marie Boehler
Attorney, Agent, or Firm—Foley & Lardner

[57] ABSTRACT

A torque distribution control device for a four-wheel drive vehicle includes a rotational speed differential responsive type control coupling combined with a front differential of a front wheel drive line. The control coupling has a variable orifice for varying its torque transfer characteristic and thereby varying distribution of engine torque between front and rear wheels. The orifice opening of the variable orifice varies depending upon a variation of a lateral acceleration of the vehicle, e.g., the orifice opening increases as the lateral acceleration increases.

16 Claims, 5 Drawing Sheets

TORQUE DISTRIBUTION CONTROL DEVICE FOR FOUR-WHEEL DRIVE VEHICLE

BACKGROUND OF THE INVENTION

1. Field of the Invention

The present invention relates to a torque distribution control device for a four-wheel drive vehicle, i.e., a device for controlling distribution of engine torque or power between the front and rear wheels of a four-wheel drive vehicle on the basis of a vehicle running condition.

2. Description of the Prior Art

An example of a prior art torque distribution control device for a four-wheel drive vehicle is disclosed in Japanese Patent Provisional Publication No. 61-169326 or 62-50231.

Such a prior art control device includes a multi-disc clutch incorporated in a front wheel drive line or rear wheel drive line for producing a desired transfer torque through control of a hydraulic pressure supplied thereto. The clutch engaging force, which is determined by the hydraulic pressure, increases as a detected rotational speed differential between the front and rear wheels increases. The ratio of the clutch engaging force (i.e., transfer torque) relative to the rotational speed differential between the front and rear wheels increases as the lateral acceleration of the vehicle increases.

A problem of the prior art torque distribution control device is that a control performed thereby is complicated. That is, with the prior art control device, it is necessary to obtain the rotational speed differential between the front and rear wheels by computation on the basis of the signals from vehicle wheel speed sensor, and vary the clutch engaging hydraulic pressure in response to a variation of the rotational speed differential so that a desired torque distribution is obtained. Accordingly, the control device is required to have a rapid responsiveness without causing any hunting.

Another problem is that the device is expensive since it requires a microcomputer having a high responsiveness, in order to exercise a complicated control and reduce a computation time.

A further problem is that the device is heavy and bulky, i.e., it requires a large space due to the provisions of a hydraulic pump, accumulator, etc.

SUMMARY OF THE INVENTION

In accordance with the present invention, there is provided a novel and improved torque distribution control device for a four-wheel drive vehicle having a front wheel drive line and rear wheel drive line. The control device comprises a rotational speed differential responsive type control coupling disposed in one of the drive lines and having a rotor and cam ring rotatable relative to each other, hydraulic fluid discharge means responsive to a rotational speed differential between the rotor and cam ring for discharging a quantity of hydraulic fluid proportional to the rotational speed differential, and variable orifice means for restricting discharge of hydraulic fluid by the discharge means and thereby producing a transfer torque between the rotor and cam ring.

The control device further comprises actuator means for actuating the variable orifice means and thereby changing an orifice opening of the variable orifice means, lateral acceleration detecting means for detecting a lateral acceleration of the vehicle and producing a signal representative thereof, and control means for controlling an operation of the actuator means in response to the signal from the lateral acceleration detecting means for thereby controlling the orifice opening of the variable orifice means on the basis of the lateral acceleration of the vehicle.

The above structure is effective for solving the above noted problems inherent in the prior art device.

It is accordingly an object of the present invention to provide a novel and improved torque distribution control device for a four-wheel drive vehicle which is simple in structure, compact, light in weight and economical, but can attain an optimum torque distribution between front and rear wheels.

It is a further object of the present invention to provide a novel and improved torque distribution control device of the above described character which can reduce the load on a computer and shorten the computation time performed thereby.

It is a further object of the present invention to provide a novel and improved torque distribution control device of the above described character which can perform a torque distribution control based on a rotational speed differential between the front and rear wheels and a lateral acceleration of the vehicle without having to actively detect the rotational speed differential between the front and rear wheels.

It is a further object of the present invention to provide a novel and improved torque distribution control device of the above described character which does not require any additional hydraulic devices.

DETAILED DESCRIPTION OF THE PREFERRED EMBODIMENT

Figure 1:
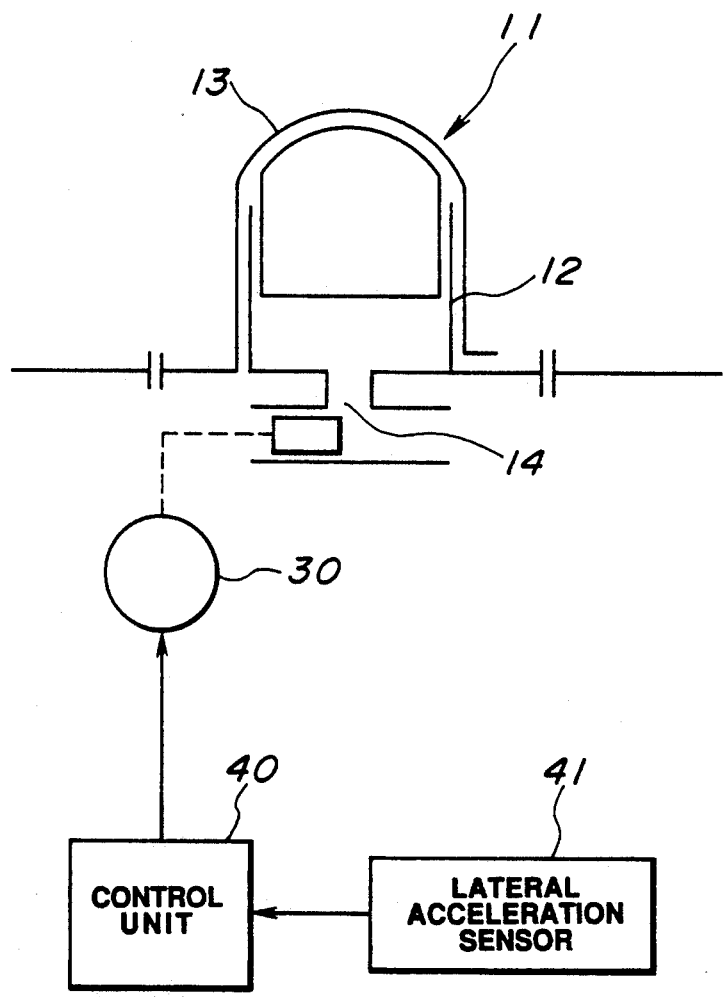
FIG. 1 is a diagrammatic view of a torque distribution control device for a four-wheel drive vehicle according to an embodiment of the present invention.

Referring to FIG. 1, a brief description of the invention will first be made.

A torque distribution control device of this invention includes a rotational speed differential responsive type control coupling or so-called orifice coupling generally designated by 11. The control coupling 11 includes a rotor 12 and cam ring 13 which are disposed concentrically with each other and adapted to cause a discharge flow of hydraulic fluid in response to a rotational speed differential therebetween. The control coupling 11 is incorporated in a front wheel drive line or rear wheel drive line of a four-wheel drive vehicle and further includes a variable orifice means 14 for restricting the above described discharge flow of hydraulic fluid and thereby producing a transfer torque between the rotor 12 and cam ring 13 in response to a rotational speed differential between the rotor 12 and cam ring 13.

The torque distribution control device further includes an orifice actuator 30 for actuating the variable orifice means 14 to vary the orifice opening response to an actuation signal supplied thereto, a lateral acceleration detecting means 41 for detecting a lateral acceleration of an associated vehicle and producing a control signal representative thereof, and an orifice control means 40 for supplying the actuation signal to the orifice actuator 30 and thereby causing the orifice opening variation in response to the control signal from the lateral acceleration detecting means 41.

The torque distribution control device 11 operates as follows.

In the event of a wheel slippage due to driving or in the event of cornering or the like, there is caused a rotational speed differential between the front and rear wheels. By this rotational speed differential, the rotor 12 and cam ring 13 of the control coupling 11 incorporated in the front wheel drive line or rear wheel drive line of the four-wheel drive vehicle are caused to rotate relative to each other, thus causing a quantity of hydraulic fluid to be discharged under restriction by means of the variable orifice means 14.

On the other hand, in the event of the occurrence of a lateral acceleration such as caused during cornering or the like, the orifice opening of the variable orifice means 14 is caused to vary under control of the orifice control means 40 and orifice actuator 30 on the basis of the lateral acceleration detected by the lateral acceleration detecting means 41.

Accordingly, in the event of the occurrence of a rotational speed differential between the front and rear wheels and a lateral acceleration of the vehicle, a transfer torque responsive not only to the rotational speed differential but also to the lateral acceleration is caused by the control coupling 11 through control of the flow restriction by means of the variable orifice means 14.

For example, the ratio of the transfer torque to the rotational speed differential increases as the orifice opening of the variable orifice means 14 decreases. Thus, the larger the transfer torque becomes, the more the torque distribution is directed toward an equal four-wheel distribution mode, i.e., a distribution mode in which the torque is equally distributed to four wheels.

Figure 2:
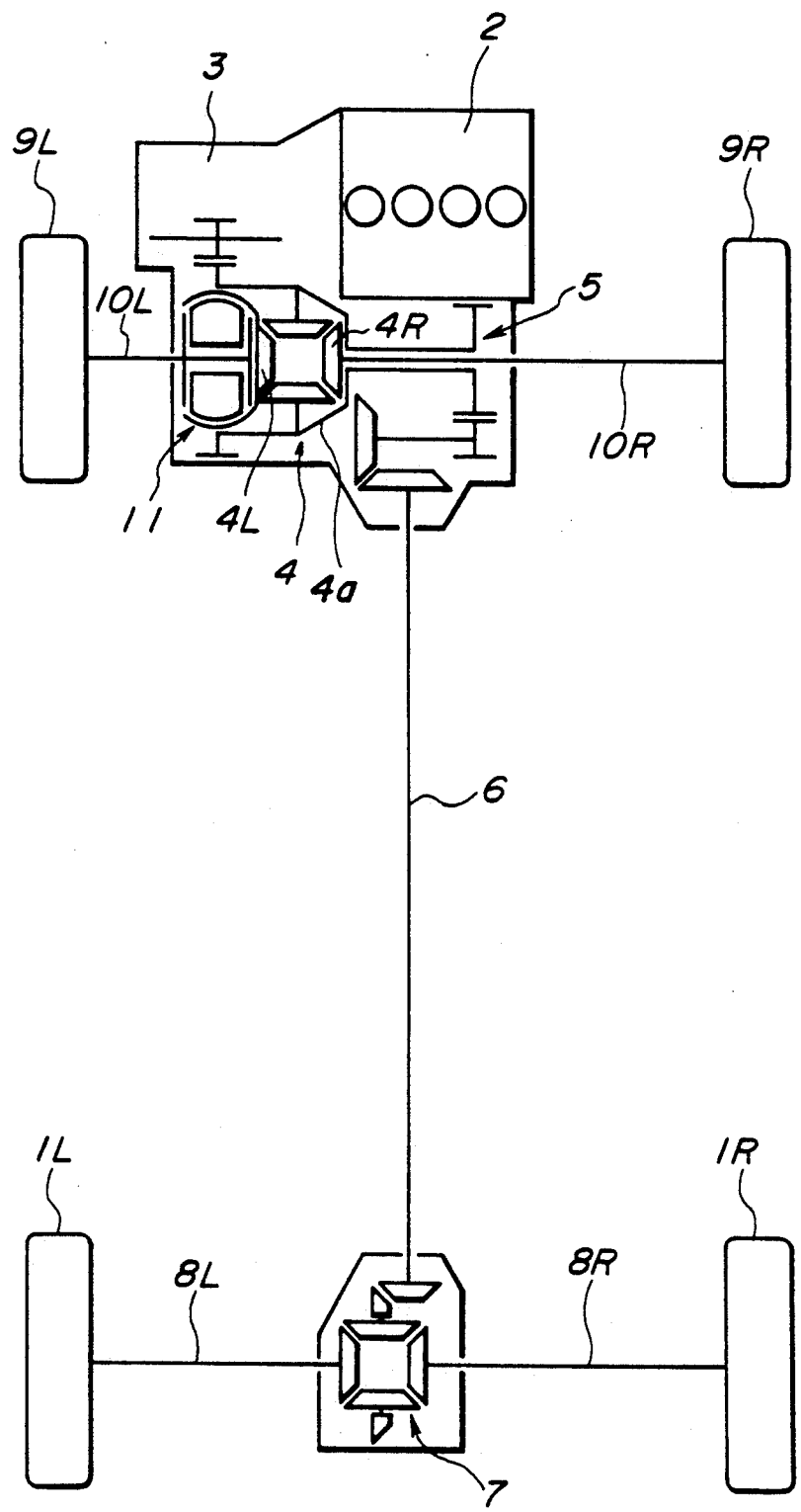
FIG. 2 is a diagrammatic view of a drive train of a four-wheel drive vehicle in which the torque distribution control device of FIG. 1 is incorporated.
Figure 3:
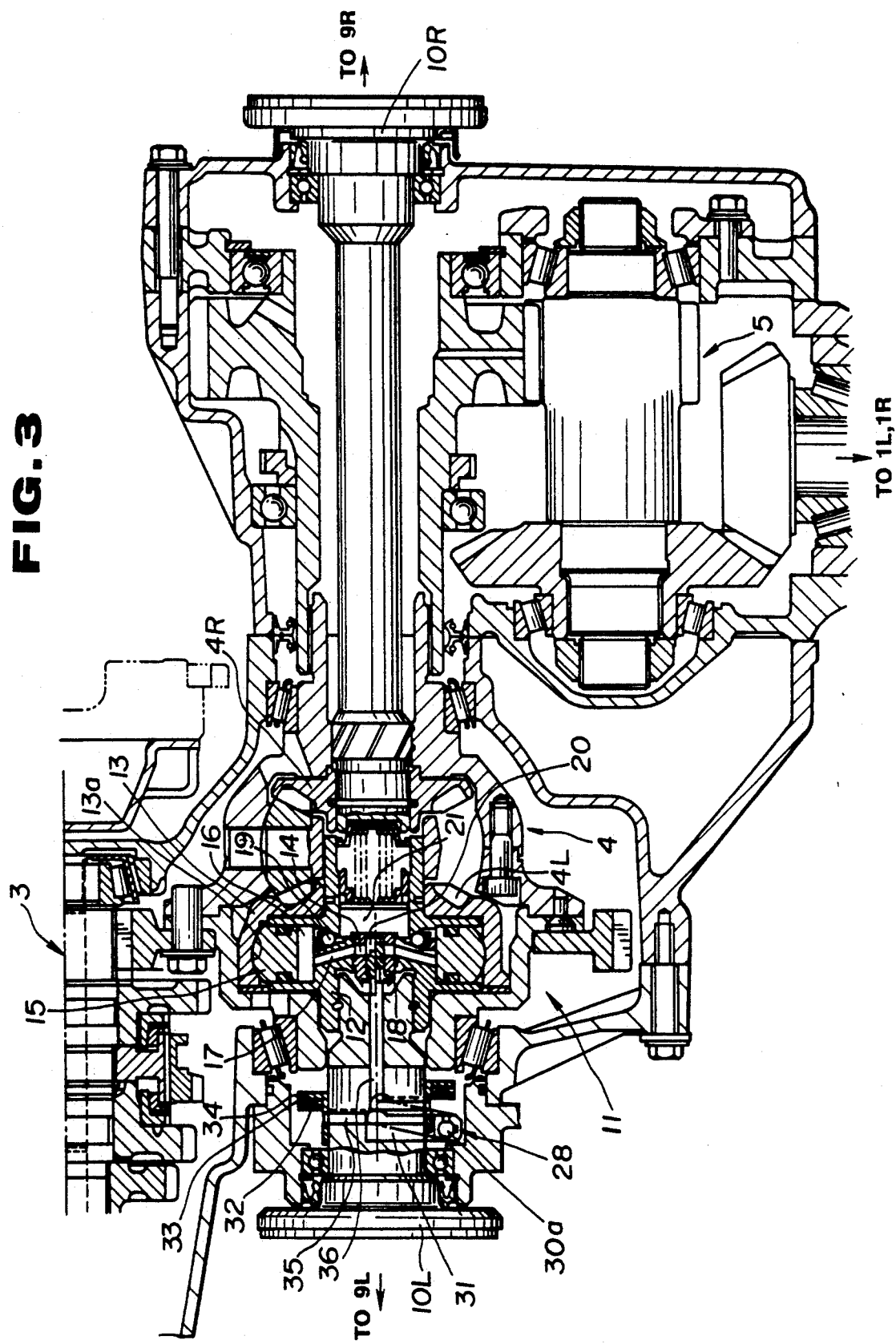
FIG. 3 is a sectional view of a front wheel drive line of the drive train of FIG. 2.
Figure 4:
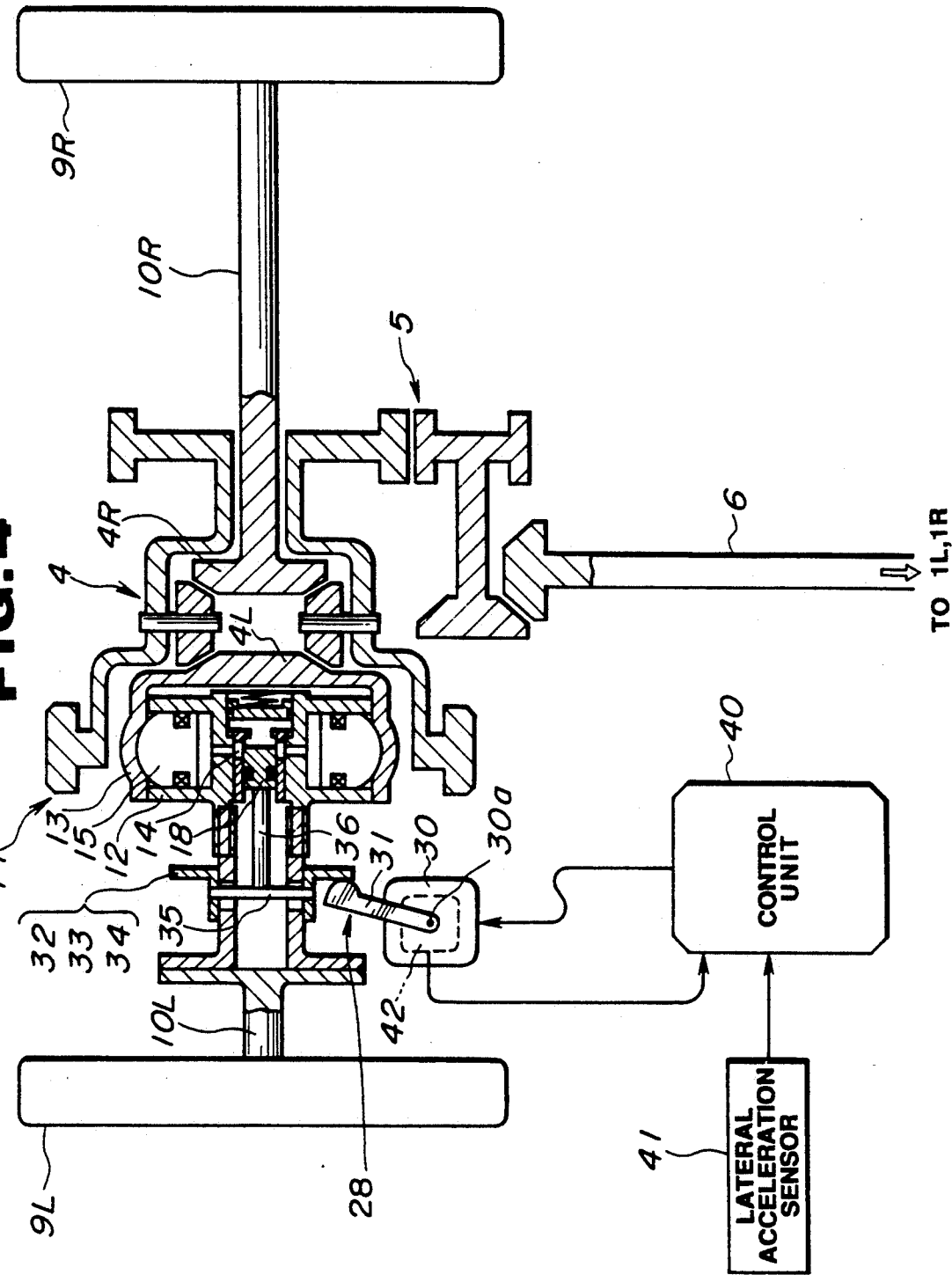
FIG. 4 is a schematic view of the torque distribution control device of FIG. 1 together with the front wheel drive line.

Referring to FIGS. 2 to 4, the torque distribution control device of this invention will be described more in detail.

In FIG. 2, a four-wheel drive vehicle in which the torque distribution control device of this invention is incorporated, is shown by way of example as being of the type derived from an F—F (front engine-front drive) vehicle and of the permanent rear-drive type. The vehicle has at the front a transverse engine 2, transmission 3, front differential 4 and transfer gearing 5. The torque or power of the engine 2 is transmitted to the rear wheels 1L and 1R by way of the transmission 3, a differential case 4a of the front differential 4, transfer gear 5, propeller shaft 6, rear differential 7 and rear drive axles 8L and 8R. On the other hand, the torque of the engine 2 is transmitted to a left front wheel 9L (when viewed from the rear end of the vehicle) by way of the transmission 3, a left side gear 4L of the front differential 4, control coupling 11 and a left front drive axle 10L and to a right front wheel 9R by way of the transmission 3, a right side gear 4R of the front differential 4 and a right front drive axle 10R.

In this instance, since the differential case 4a of the front differential 4 distributes an engine torque equally to the left and right side gears 4L and 4R, the engine torque distribution to the front wheels 9L and 9R entirely depends upon the transfer torque transmitted through the control coupling 11.

The above described control coupling 11 is built in or combined with the front differential 4, or more specifically, disposed between the left side gear 4L of the front differential 4 and the left front wheel drive axle 10L for producing a transfer torque in response to a rotational speed differential $\Delta N$ between the rotor 12 and cam ring 13.

As shown in FIG. 3, the control coupling 11 includes the aforementioned cam ring 13 integral with the left side gear 4L and formed with a rise and fall cam surface 13a at the inner periphery thereof, the aforementioned rotor 12 accommodated concentrically within the cam ring 13 and splined to the left front drive axle 10L to rotate therewith, six radial pistons 15 installed in the rotor 12 for reciprocation while being driven by the cam surface 13a in response to a rotational difference between the rotor 12 and cam ring 13, pressure chambers 16 defined by the pistons 15 and variable in volume in response to reciprocations of the pistons 15, radial discharge passages 17 in communication with the respective pressure chambers 16, variable orifices 14 disposed at the radially inner ends of the respective discharge passages 17 and cooperating with a spool 18 so as to be variable in opening in response to axial movement of the spool 18, regulator passages 19 extending between the respective pressure chambers 16 and an accumulator chamber 21 for providing communication therebetween by way of check valves (no numeral), and a spool chamber 20 disposed between the variable orifices 14 and the accumulator chamber 21 for providing communication therebetween.

The rise and fall cam surface 13a, pistons 15, pressure chambers 16, and discharge passages 17 constitute a hydraulic fluid discharge means for discharging a quantity of hydraulic fluid proportional to a rotational speed differential between the rotor 12 and cam ring 13.

The construction and operation of the control coupling 11 are basically similar to those described in U.S. Pat. Nos. 4,921,085; 4,957,473; and 4,958,711 and therefore, a further description thereof is omitted for brevity.

Assuming that the rpm of the front wheel is Nf, the rpm of the right front wheel 9R is Nfr, the rpm of the left front wheel 9L is $N_{fl}$, the rpm of the rear wheels is $N_r$, and the rpm of the left side gear 4L is $N_h$, the following expressions are obtained.

$$N_f = \frac{N_{fl} + N_{fr}}{2}, N_r = \frac{N_h + N_{fr}}{2}$$

From this, $N_h - N_{fl} = 2$ ($N_r - Nf$).

Thus, two times the rotational speed differential between the front and rear wheels ($N_r - N_f$) is supplied as an input to the control coupling 11 to cause a coupling rotational speed differential $\Delta N$.

By this, it becomes possible to control the torque distribution to the front wheels by controlling the torque distribution to the left front wheel, thus making it possible to reduce by half the necessary torque transfer capacity of the control coupling as compared with, for example, the case in which the control coupling is incorporated in a front wheel side propeller shaft.

A stepping motor 30 is employed to constitute the aforementioned orifice actuator for varying the degree of opening of the variable orifices 14 in response to an external signal. A control motion transmitting mechanism 28 is provided between a shaft 30a of the stepping motor 30 and the spool 18 for transmitting a control motion of the stepping motor 30 to the spool 18. To this end, the control motion transmitting mechanism 28 includes a fork 31 secured at one end to the shaft 30a of the stepping motor 30 to rotate together therewith, slide ring 34 axially moveably installed on the left front axle 10L, thrust plate 32 installed on the slide ring 34 by way of a needle bearing 33 and held in contact with a free end of the fork 31 to move therewith, transverse pin 35 extending transversely of the left front wheel drive axle 10L and secured to the slide ring 34 to move therewith, and a push rod 36 interposed between the transverse pin 35 and the spool 18 for transmitting motion of the transverse pin 35 to the spool 18.

A control unit 40 mainly consisting of a microcomputer is employed to constitute the aforementioned orifice control means for supplying a control signal to the stepping motor 30 and thereby controlling the orifice opening of the variable orifices 14. A lateral acceleration sensor 41 is employed to constitute the aforementioned lateral acceleration detecting means for detecting a lateral acceleration $Y_G$ of the vehicle and supplies a signal representative thereof to the control unit 40. A potentiometer 42 is installed on the stepping motor 30 for detecting an angular position or rotation of the shaft 30a of the stepping motor 30 and supplying a signal representative thereof to the control unit 40.

The operation will now be described.

Figure 5:
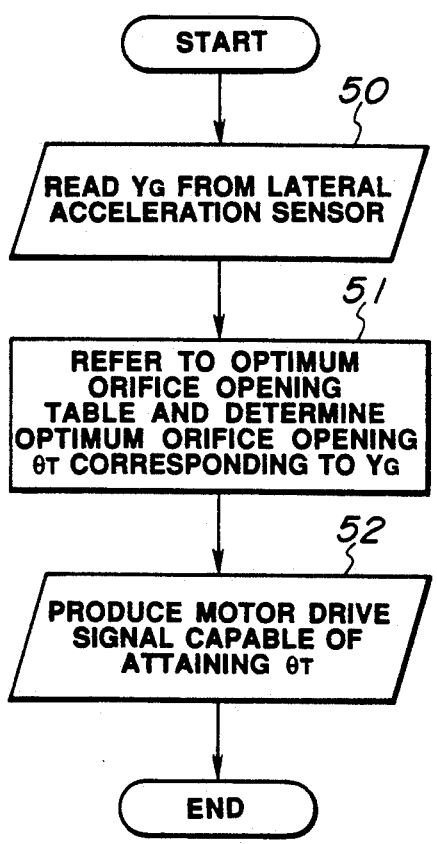
FIG. 5 is a flowchart of a control routine executed by the torque distribution control device of FIG. 1.

FIG. 5 shows a routine of control operations executed by the control unit 40 repeatedly with a predetermined control cycle (e.g., 10 msec).

At step 50, a lateral acceleration $Y_G$ detected by the lateral acceleration sensor 41 is read.

Figure 6:
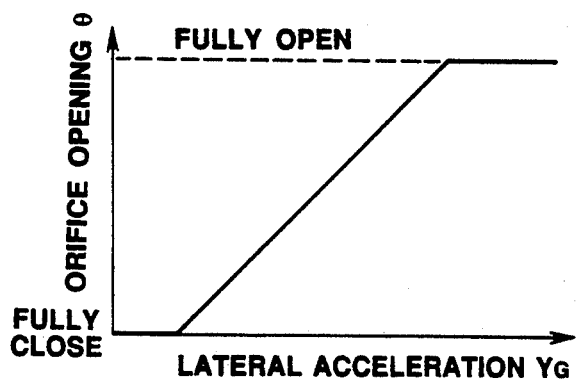
FIG. 6 is a graph representing an optimum orifice opening in relation to a lateral acceleration.

At step 51, an optimum orifice opening table such as shown in FIG. 6 is used to look up an optimum orifice opening $\theta_T$ therein on the basis of the lateral acceleration $Y_G$ obtained at step 50.

In order that an identical turning characteristic is attained irrespective of the coefficients of the friction $\mu$ of a road surface and that both a high driveability and stability are attained at starting and at straight-ahead acceleration, the optimum orifice opening table is fixed, as shown in FIG. 6, such that when the lateral acceleration $Y_G$ is zero or small the orifice opening $\theta_T$ is reduced to zero, i.e. the variable orifices 14 are fully closed for thereby increasing the torque distribution to the front wheels 9L and 9R. As the lateral acceleration $Y_G$ increases beyond a predetermined small value, the orifice opening $\theta_T$ is increased for thereby reducing the torque distribution to the front wheels 9L and 9R, and as the lateral acceleration $Y_G$ increases beyond a predetermined large value (corresponding to a vehicle running condition on a high-$\mu$ road surface), the variable orifices 14 are fully open.

At step 52, a control signal capable of attaining an optimum orifice opening $\theta_T$ is supplied to the stepping motor 30.

Next, a torque distribution between the front and rear wheels will be described with respect to those attained at straight-ahead running and turning separately.

(A) In the event of straight-ahead running:

In the event of straight-ahead running, the variable orifices 14 are completely closed since the lateral acceleration $Y_G$ under this running condition is normally zero and further since even when a lateral wind blows or the road surface on which the vehicle is running is slanted, only a small lateral acceleration $Y_G$ of the vehicle is caused.

When, during straight-ahead running, there is caused a small rotational speed differential between the front and rear wheels, such as at straight-ahead, constant-speed running on a high-$\mu$ road surface, there is not caused any rotational speed differential between the rotor 12 and cam ring 13 of the orifice coupling 11, thus not causing any transfer torque to the front wheels 9L and 9R and maintaining the rear wheel drive.

In the event a rotational speed differential between the front and rear wheels is caused by a rear wheel slippage due to driving such as caused by starting, climbing, acceleration, etc., there is caused between the rotor 12 and cam ring 13 of the orifice coupling 11 a rotational speed differential $\Delta N$ corresponding to two times the rotational speed differential between the front and rear wheels, thus causing the orifice coupling 11 to produce a transfer torque which is equal to the engine torque distributed to the front wheels, thus attaining a four-wheel drive mode in which the engine torque is nearly equally distributed to the four wheels and therefore making it possible to improve the driving efficiency and running stability.

Figure 7:
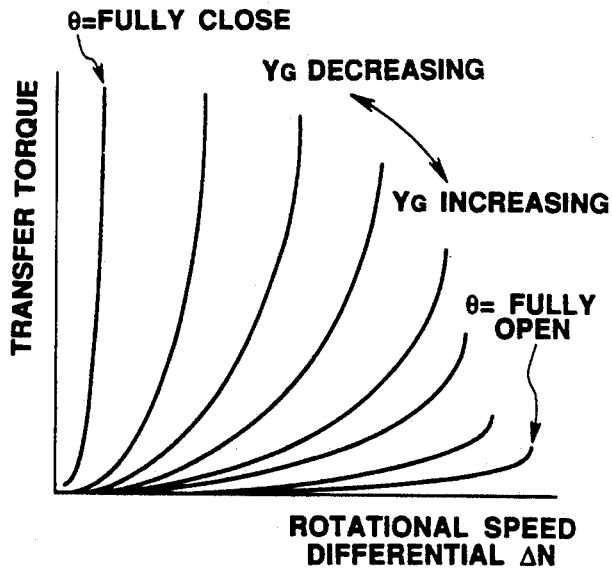
FIG. 7 is a graph representing a transfer torque characteristic of the torque distribution control device of FIG. 1.

The torque distribution control device of this invention has a transfer torque characteristic as shown in FIG. 7. That is, as the rotational speed differential $\Delta N$ between the rotor 12 and cam ring 13 increases, the transfer torque increases along the various curves of the second order, which curves are selected through control of the orifice opening $\theta$. As seen from FIG. 7, when the orifice opening $\theta$ is zero, i.e., the variable orifices 14 are fully closed, a slight rotational speed differential $\Delta N$ can cause a four-wheel drive mode in which the engine torque is nearly equally distributed to the four wheels.

(B) In the event of turning:

In the event of turning, there is caused a lateral acceleration $Y_G$ in response to a turning radius, vehicle speed and a coefficient of friction $\mu$ of a road surface.

For example, assuming a constant turning in which the turning radius and vehicle speed are constant but the coefficient of friction $\mu$ of the road surface varies, a high-$\mu$ road causes a large lateral acceleration $Y_G$, thus causing the variable orifices 14 to increase in orifice opening, and a low-$\mu$ road causes a small lateral acceleration, thus causing the variable orifices 14 to reduce in orifice opening.

Accordingly, in the event of a constant turning on a high-$\mu$ road, the torque distribution to the front wheels is small, thus causing the vehicle to exhibit a strong understeer and therefore making it possible to attain such a good turning ability as is attained by the F-R (front engine-rear drive) vehicle. Further, in the event of a constant turning on a low-$\mu$ road surface, the distribution of the engine torque to the front wheels is increased, thus causing the vehicle to exhibit an understeer and thereby making it possible to attain a good turning stability.

In the event of an accelerated turning, the lateral acceleration $Y_G$ gradually increases from the entrance of a corner to the exit of same. At the entrance of the corner, a torque transfer characteristic of a large ratio of the transfer torque to the rotational speed differential is selected out of the torque transfer characteristics of FIG. 7, thus increasing the torque distribution to the front wheels and making it possible to attain a tendency to understeer and therefore a turning stability. At the exit of the corner, a torque transfer characteristic having a small ratio of the transfer torque to the rotational speed differential is selected out of the characteristics of FIG. 7, thus making it possible to gradually increase the torque distribution to the front wheels when the rotational speed differential between the front and rear wheels is caused by a wheel slippage due to driving in response to an accelerating operation, for thereby preventing a rapid increase of the intensity of oversteer and improving the controllability of the vehicle.

From the foregoing, it will be understood that according to the present invention the control coupling 11 is incorporated in the front wheel drive line and the orifice opening $\theta$ is controlled in response to a lateral acceleration $Y_G$ only, thus making it possible to attain an optimum torque distribution between the front and rear wheels with a simple control and low cost and without causing any substantial increase in weight and space. That is, the torque distribution control in response to a rotational speed differential between the front and rear wheels solely depends upon the control coupling 11. Thus, differing from the prior art device, it is not necessary to detect the rotational speed differential between the front and rear wheels. Further, it is not necessary to execute a control in response to a variation of a rotational speed differential between the front and rear wheels unless the lateral acceleration $Y_G$ varies, thus making it possible, substantially similarly to the prior art device, to attain a torque distribution control in response to a rotational speed differential between the front and rear wheels and a lateral acceleration with a reduced load on the microcomputer and a reduced computation time. It will be further understood that the control coupling 11 which is combined with the front differential 4, is compact in size and light in weight, without requiring additional hydraulic devices such as a hydraulic pump, accumulator, etc.

While the present invention has been described and shown as being applied to a four-wheel drive vehicle of the type having at the front a transverse engine, transmission, differential and transfer, and based on a permanent rear drive vehicle, this is not for the purpose of limitation. For example, the present invention may otherwise be applied to a vehicle of the type derived from a permanent front drive vehicle or a vehicle having at the front a longitudinal engine and transmission and derived from a permanent front or rear drive vehicle.

What is claimed is:

1. A torque distribution control device for a four-wheel drive vehicle having a front wheel drive line and rear wheel drive line, comprising:
   a rotational speed differential responsive control coupling disposed in one of the drive lines and having a rotor and cam ring rotatable relative to each other, hydraulic fluid discharge means responsive to a rotational speed differential between said rotor and said cam ring for discharging a quantity of hydraulic fluid proportional to said rotational speed differential, and variable orifice means for restricting discharge of said hydraulic fluid by said discharge means and thereby producing a transfer torque between said rotor and said cam ring;
   actuator means for actuating said variable orifice means and thereby changing an orifice opening of said variable orifice means;
   lateral acceleration detecting means for detecting a lateral acceleration of the vehicle and producing a signal representative thereof; and
   control means for controlling an operation of said actuator means in response to the signal from said lateral acceleration detecting means for thereby controlling the orifice opening of said variable orifice means on the basis of the lateral acceleration of the vehicle;
   wherein said one of the drive lines has a differential, and said control coupling is combined with the differential to constitute an assembled unit; and
   wherein the differential has a pair of side gears, and said one of the drive lines further has a pair of drive axles between which the differential is interposed, and said control coupling is interposed between one of the side gears and one of the drive axles.

2. A torque distribution control device according to claim 1, wherein said control means comprises means for setting the orifice opening of said variable orifice means in such a manner that the orifice opening of said variable orifice means increases as the lateral acceleration of the vehicle increases.

3. A torque distribution control device according to claim 2, wherein said control means comprises means for setting the orifice opening of said variable orifice means in such a manner that the orifice opening of said variable orifice means is fully closed when the lateral acceleration of the vehicle is smaller than a predetermined value.

4. A torque distribution control device according to claim 2, wherein said control means comprises means for setting the orifice opening of said variable orifice means in such a manner that the orifice opening of said variable orifice means is fully opened when the lateral acceleration of the vehicle is larger than a predetermined value.

5. A torque distribution control device according to claim 1, wherein said control means comprises table means for determining an optimum orifice opening of said variable orifice means on the basis of the lateral acceleration detected by said lateral acceleration detecting means.

6. A torque distribution control device according to claim 1, wherein said cam ring is formed integrally with the one of the side gears and said rotor is splined to the one of the drive axles.

7. A torque distribution control device according to claim 6, wherein the differential also constitutes part of the other of the drive axles.

8. A four-wheel drive vehicle comprising:
   an engine for producing an engine torque;
   a first laterally opposed pair of driving wheels;
   a second laterally opposed pair of driving wheels;
   a first drive line for transmitting a portion of the engine torque to said first pair of driving wheels;
   a second drive line for transmitting a remaining portion of the engine torque to said second pair of driving wheels; and
   a torque distribution control device for controlling distribution of the engine torque between said first and second pair of driving wheels;
   said torque distribution control device including a rotational speed differential responsive control coupling incorporated in said first drive line;

said control coupling having a rotor and cam ring rotatable relative to each other, hydraulic fluid discharge means responsive to a rotational speed differential between said rotor and said cam ring for discharging a quantity of hydraulic fluid proportional to said rotational speed differential, and variable orifice means for restricting discharge of said hydraulic fluid by said discharge means and thereby producing a transfer torque between said rotor and said cam ring;

said torque distribution control device further including actuator means for actuating said variable orifice means and thereby changing an orifice opening of said variable orifice means, lateral acceleration detecting means for detecting a lateral acceleration of the vehicle and producing a signal representative thereof, and control means for controlling an operation of said actuator mean sin response to the signal from said lateral acceleration detecting means for thereby controlling of orifice opening of said variable orifice means on the basis of the lateral acceleration of the vehicle;

wherein said first drive line has a differential, and said control coupling is combined with said differential to constitute an assembled unit; and wherein said differential has a pair of side gears, and said first drive line further has a pair of drive axles between which said differential is interposed, and said control coupling is interposed between one of said side gears and one of said drive axles.

9. A four-wheel drive vehicle according to claim 8, wherein said control means comprises means for setting the orifice opening of said variable orifice means in such a manner that the orifice opening of said variable orifice means increases as the lateral acceleration of the vehicle increases.

10. A four-wheel drive vehicle according to claim 9, wherein said control means comprises means for setting the orifice opening of said variable orifice means in such a manner that the orifice opening of said variable orifice means is held fully closed when the lateral acceleration of the vehicle is smaller than a predetermined value.

11. A four-wheel drive vehicle according to claim 9, wherein said control means comprises means for setting the orifice opening of said variable orifice means in such a manner that the orifice opening of said variable orifice means is held fully open when the lateral acceleration of the vehicle is larger than a predetermined value.

12. A four-wheel drive vehicle according to claim 8, said control means comprises table means for determining an optimum orifice opening of said variable orifice means on the basis of the lateral acceleration detected by said lateral acceleration detecting means.

13. A four-wheel drive vehicle according to claim 8, wherein said cam ring is formed integrally with said one of said side gears and said rotor is splined to said one of said drive axles.

14. A four-wheel drive vehicle according to claim 13, wherein said differential also constitutes part of said second drive line.

15. A four-wheel drive vehicle according to claim 13, wherein said first pair of driving wheels are front wheels.

16. A four-wheel drive vehicle comprising:
a transversely mounted front engine and transmission;
a front wheel drive line for transmitting a torque to front wheels, said front wheel drive line including a front differential having a differential case drivingly connected to said transmission and a pair of side gears, and a pair of front drive axles;
a rear wheel drive line for transmitting a torque to rear wheels, said rear wheel drive line including a transfer drivingly connected to said differential case of said front differential, a propeller shaft drivingly connected to said transfer, a pair of rear drive axles and a rear differential for drivingly connecting said propeller shaft to said rear drive axles;
a torque distribution control device for controlling distribution of a torque of said engine between said front and rear wheels;
said torque distribution control device including a rotational speed differential responsive control coupling incorporated in said front drive line;
said control coupling having a rotor connected to one of said front drive axles and a cam ring formed integrally with one of said side gears of said front differential, hydraulic fluid discharge means responsive to a rotational speed differential between said rotor and said cam ring for discharging a quantity of hydraulic fluid proportional to said rotational speed differential, and variable orifice means for restricting discharge of said hydraulic fluid by said discharge means and thereby producing a transfer torque between said rotor and said cam ring;
said torque distribution control device further including actuator means for actuating said variable orifice means and thereby changing an orifice opening of said variable orifice means, lateral acceleration detecting means for detecting a lateral acceleration of the vehicle and producing a signal representative thereof, and control means for controlling an operation of said actuator means in response to the signal from said lateral acceleration detecting means for thereby controlling the orifice opening of said variable orifice means on the basis of the lateral acceleration of the vehicle, said control means having means for setting the orifice opening of said variable orifice means in such a manner that the orifice opening of said variable orifice means increases as the lateral acceleration of the vehicle increases.

* * * * *